June 28, 1932. R. B. RESPESS 1,864,937
PROCESS FOR THE MANUFACTURE OF TREAD ELEMENTS FOR VEHICLE TIRES
Filed March 30, 1928 3 Sheets-Sheet 2
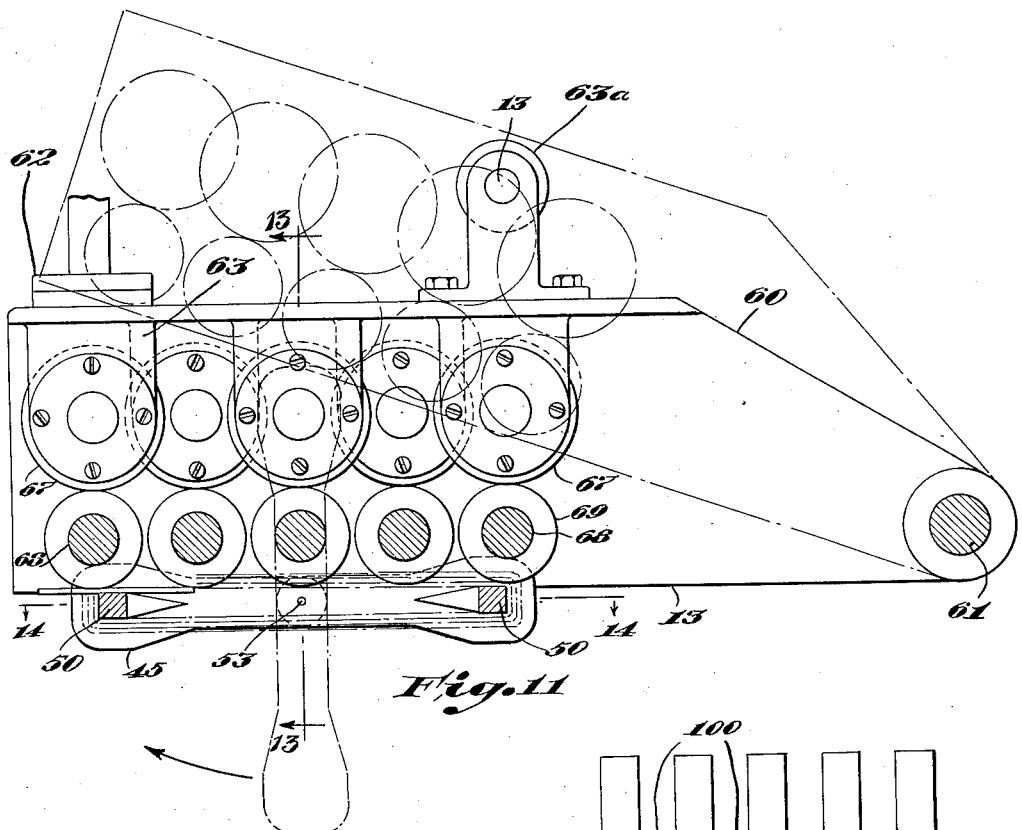
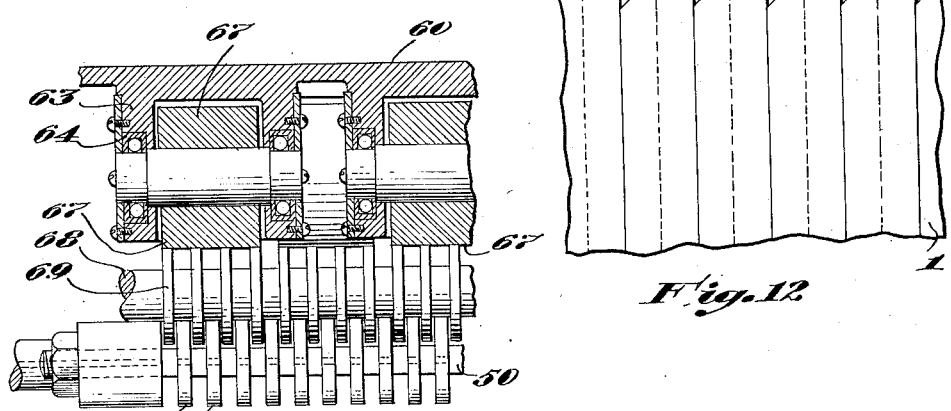
Inventor
Roland B. Respess
by Roberts Cushman & Woodbury
Att'ys.

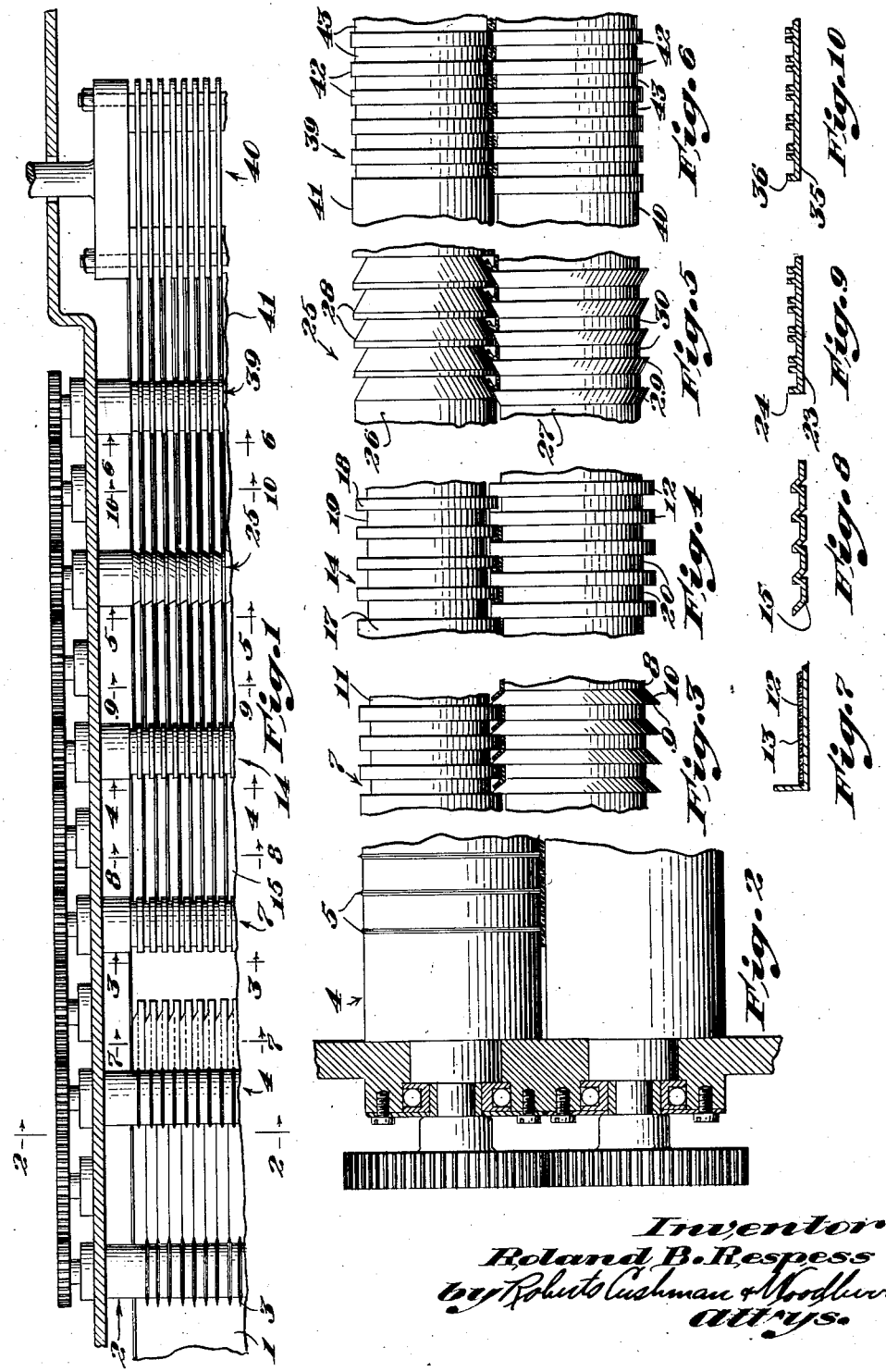

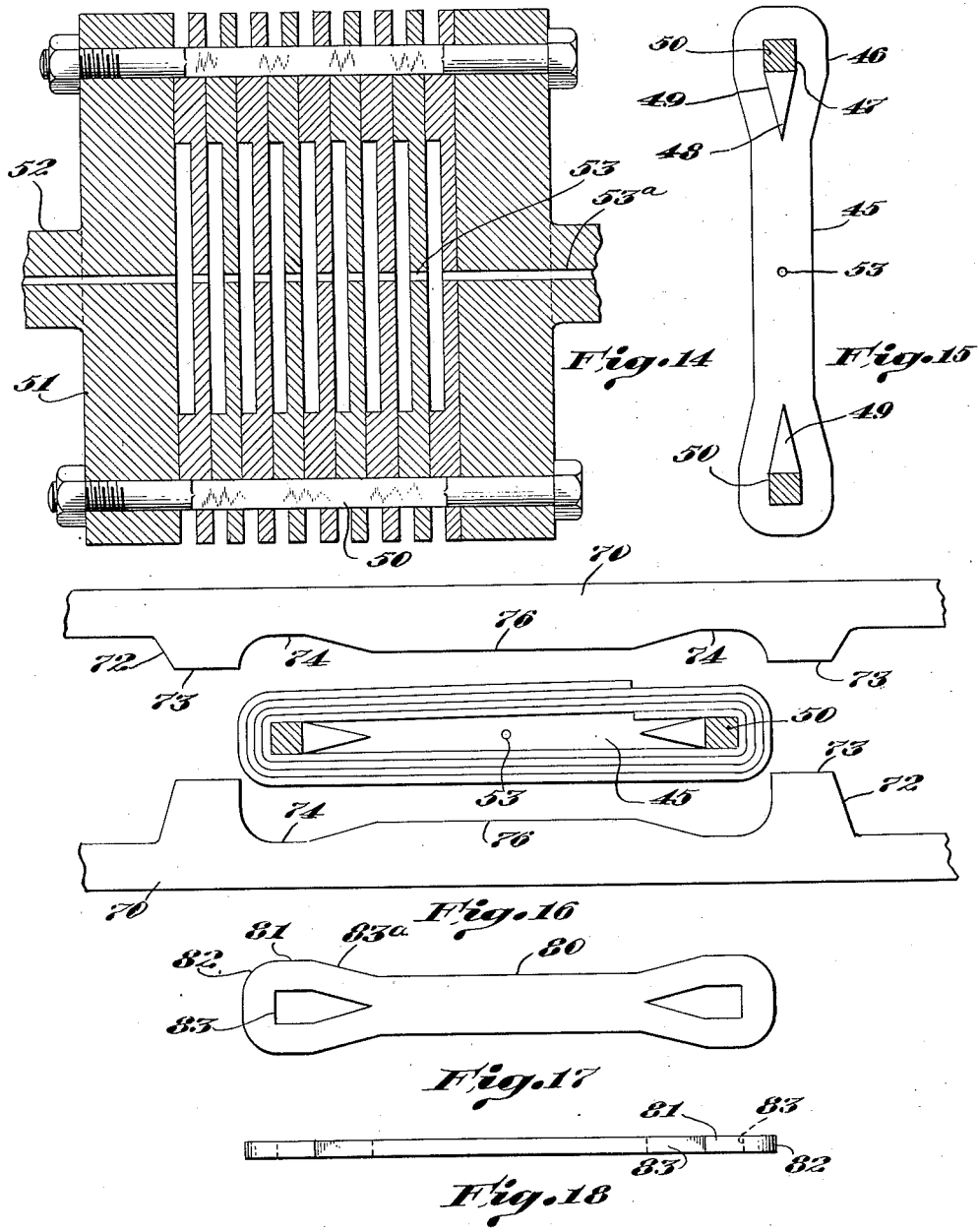

Patented June 28, 1932

1,864,937

UNITED STATES PATENT OFFICE

ROLAND B. RESPESS, OF WICKFORD, RHODE ISLAND, ASSIGNOR, BY MESNE ASSIGNMENTS, TO RESPATS INC., OF CRANSTON, RHODE ISLAND, A CORPORATION OF RHODE ISLAND

PROCESS FOR THE MANUFACTURE OF TREAD ELEMENTS FOR VEHICLE TIRES

Application filed March 30, 1928. Serial No. 265,986.

This invention relates to a process and apparatus for manufacturing articles of rubber and an included material, such as for example non-skid elements for application to vehicle tires, these elements being formed of fabric woven of textile fibers and wires, impregnated with rubber, and arranged so that the wire ends form an effective non-skid surface, while the opposite surface of the element is free from projecting wires in order to prevent undue wear on the tire to which the devices may be applied.

Objects of the invention, among others, are to provide an improved and highly efficient method and means for manufacturing devices of this character, whereby the various manufacturing steps may take place continuously and progressively with the minimum requirement for manual handling of the material, to permit accurate forming and shaping of the non-skid devices, and proper vulcanization of the same in quantities, under suitable pressure, so that sturdy non-skid devices are formed, within comparatively close dimensional limits.

In the accompanying drawings, which illustrate by way of exemplification one form of apparatus for manufacturing devices of this character, Fig. 1 is a more or less diagrammatic view of the apparatus designed continuously to manufacture non-skid devices of this character;

Figs. 2, 3, 4, 5 and 6 are sections upon lines 2—2, 3—3, 4—4, 5—5 and 6—6, respectively, of Fig. 1;

Figs. 7, 8, 9 and 10 are sections upon lines 7—7, 8—8, 9—9 and 10—10, respectively, of Fig. 1;

Fig. 11 is a side view of the mechanism for winding the material upon a form prior to vulcanization, certain parts being shown in full and dotted lines to indicate their various positions;

Fig. 12 is a view of the ends of the fabric strips, showing the manner in which they may be formed to permit their initial feeding to the forming rolls;

Fig. 13 is a section o. line 13—13 of Fig. 11;

Fig. 14 is a section on line 14—14 of Fig. 11;

Fig. 15 is an elevational view of a vulcanizing form or support;

Fig. 16 is a view of a similar support showing the fabric wound about the same, and the vulcanization molds ready to be moved into position about the fabric;

Fig. 17 is a plan view of one of the completed non-skid devices; and

Fig. 18 is a side elevational view of the same.

In the manufacture of non-skid devices in accordance with the present process, the base material preferably may comprise fabric having its warp (or weft) strands formed of textile fibers, and some or all of its weft (or warp) strands formed of wire. These wire strands may be formed of separate individual wires, or may each consist of a single wire. Wire fabric of this character preferably is first rubberized or impregnated in a suitable rubber compound, and then is slit into elongate strips with the wire strands disposed transversely of the same. The longitudinal intermediate portions of these strips may then be scored so that each strip may be more easily bent up into a U-shape as viewed in cross-section, with the raw wire edges exposed at the upper portion of the U-shaped strip thus formed, and with the remainder of the strip substantially free from sharp wire corners or wire ends. The U-shaped strip as thus formed is next wound upon a suitable support, which in the preferred form of the invention preferably forms one of a gang of similar supports, these supports being shaped and arranged to be disposed within a suitable vulcanizing factor, wherein the rubber impregnating material of the windings is solidified into an integral unit.

In the accompanying drawings, Fig. 1 illustrates, more or less diagrammatically, apparatus designed to receive a comparatively wide piece of impregnated textile-wire fabric, to slit the same, to score intermediate portions of the strip, to bend these strips up so that raw wire edges are juxtaposed, i. e., so that the strips are U-shaped in cross-section, and to effect the winding of the strips as thus formed upon a plurality of supports which are designed to be received within a vulcanizing mold. To this end, the wire fabric 1 is fed to the cutting factor 2, which may partake of the characteristic of the conventional Cameron cutter, being provided with a plurality of cutting disks 3.

The strips as thus slit are fed to the scoring factor 4, which may comprise a roll, shown more particularly in Fig. 2, having upstanding ridges 5 arranged to provide an elongated indentation in the intermediate part of each severed strip which is received from cutter 2. Fig. 7 illustrates the guide plate which is arranged between the scoring roll 4 and the first forming rolls 7, this figure also showing the elongate strips 12 with the intermediate longitudinal indentations 13 thereon.

The strips as thus severed and scored are fed to a plurality of rolls and guides arranged to bend each of them up into a U-shape with the wire edges in juxtaposition. For this purpose, the first pair of forming rolls, designated in general by the numeral 7, comprises a lower roll 8 having peripheral flanges 9 with beveled faces 10 adapted to receive and bend up one side of each of the elongate strips. The roll 11, which is disposed above roll 8, is provided with a plurality of alternate peripheral ribs and recesses, the former serving to hold one portion of each fabric strip in engagement with a portion of roll 8 paralleling its axis, and the latter engaging the ribs 10 to permit the fabric to be bent up by the same.

Between the first pair of forming rolls 7 and the succeeding pair of forming rolls 14 are a series of guide plates 15, shown in section in Fig. 8, each of said plates comprising flat portions paralleling the axis of the rollers and inclined portions substantially aligned with the beveled faces of ribs 10 of forming rolls 9. Thus the strips are fed to the rolls 10 with one side thereof bent up in the position determined by rolls 7.

Fig. 4 shows the second pair of forming rolls 14, each of which is provided with alternate ribs and grooves which interfit with each other, the ribs 18 of the upper roll 17 being narrower than the recesses 19 therebetween, while the recesses 20 of the lower roll 21 are wider than the ribs 22 therebetween. Preferably the ribs are provided with sides disposed in planes perpendicular to the axes of the rolls so that the fabric strips fed thereto each have one side bent up into a plane substantially at right angles to the plane occupied by the other side of each strip.

Fig. 9 illustrates the guiding means provided between the second pair of forming rolls 14 and the third pair 25, this guiding means comprising a bed portion 23 having upstanding flanges or ribs 24 to provide a plurality of channels, one leg of each of which engages the face of the bent-up side of a strip, and the other leg of which engages the edge of the portion of the strip that remains in a plane parallel to the axis of the forming rolls.

The forming rolls 25 comprise upper and lower rolls 26 and 27 which have ribs 28 and 29 formed thereon, these ribs preferably having surfaces inclined in opposite directions, the ribs 28 of the upper roll having surfaces of this character which have a greater width than the corresponding surfaces of ribs 29, the latter being spaced by flat peripheral surfaces 30 upon lower roll 26, which parallel the axis of the same. The ribs 28 and 29 are so arranged with beveled surfaces in engagement with each other that they receive the upstanding sides of the strips as they are received from guide means 23 and bend the same over to an acute angle to the portions of the strips which remain in a plane parallel to the axis of the rolls, the flat portions 30 of lower roll 26 being shaped and disposed to receive the latter portions of the fabric strips.

Fig. 10 shows the guide means 35 arranged between the forming rolls 25 and the last pair of forming rolls 39, the guiding means 35 carrying a plurality of upstanding flanges 36 which, in effect, provide spaced channels similar to those formed upon guiding means 23, the legs of these channels or the flanges 36 serving to engage the edge of the fabric portion which has not been bent up, and to engage the bend of the fabric opposite this edge.

The last pair of rolls 39 comprises a lower roll 40 and an upper roll 41, each of which has alternate ribs 42 and depressions 43, the ribs 42 being arranged in registration and substantialy in contact with each other, and the recesses 43 being arranged in alignment with the channels provided by guide means 35. Preferably the bottoms of recesses 43 are spaced from each other at such a distance that they insure the halves of the fabric strips being bent down into engagement with each other. Thus each of the fabric strips is bent into a strip having a U-shaped cross-section, with the severed wire ends in juxtaposed relation at one side thereof. Between the last pair of forming rolls 39 and the winding factor, which is designated in general by the numeral 40, I provide a guide member 41 which may be similar to the members 23 and 35 previously described.

It is evident that any suitable means such as the gearing shown in Fig. 1 may be utilized to drive the cutting, scoring and forming rolls. In order to expedite the feeding of new strips of fabric to the forming rolls, its ends may be cut as shown in Figs. 1 and 12, the side of the fabric which is to be bent up having its end cut back from the end of the other side and beveled as designated by numeral 100.

Figs. 11, 13, 14 and 15 illustrate in greater detail the various parts of the winding mechanism. This mechanism comprises a plurality of forms or supports 45, each of which is designed to receive a bent-up strip of the fabric from the last pair of forming rolls, and to have a plurality of turns of the fabric strip wound upon the same. To this end, each support 45 may comprise an elongate plate having enlarged end portions 46 with non-circular openings 47, and having upstanding lug portions 49 adjoining each of the openings, each of these lugs preferably being triangular in shape and having a pointed end 48 spaced inwardly from the adjoining opening. Preferably each opening is designed to receive a transverse fastening member 50 which may be in the form of a bolt having a square shank and passing through a plurality of aligned supports 45. The ends of these bolts preferably are received in supporting plates 51 which are rotatable upon axial projections 52. It is thus evident that the gang of winding forms thus provided is adapted to rotate as a unit about supports 52. The form elements 45 and the end members 51 may be provided with openings 53 and 53ª which are adapted to permit the exhausting of air during vulcanization.

Disposed above the supports 45 is an oscillatable frame 60, the end of which is pivotally mounted upon a fixed shaft 61. This frame may carry suitable weights 62 upon its outer end, and may have a handle 63ª to permit it to be moved up manually away from the supports 45 when desired. The frame is provided with a plurality of depending brackets 63 which receive suitable bearing elements 64, such as ball bearings that in turn engage the axles of rollers 67. There may be a plurality of these rollers arranged in alternate rows, as shown in Figs. 11 and 13.

Below the rolls 67 are a plurality of shafts 68 having outstanding ribs or rolls 69 formed integrally thereon, these elements 69 being arranged to extend into the spaces between each of the supports 45, as shown in Fig. 13. As the bent-up strips are received from the forming rolls 41, they are guided to the spaces between the form elements 45 and are wound between the same. To this end the supports 45 may be rotated as a unit in the direction indicated by the curved arrow in Fig. 11. During the rotation of the supports, the winding frame 60 oscillates between its full and its dotted line positions, one or more of the rolls 69 continuing in engagement with the bent-up fabric strip to hold the same against the shanks of bolts 50, about which it is being wound. The shafts 68 being quite long, the rolls 67 thereabove are effective in preventing them from springing away from the winding forms 45 during this operation.

When a suitable number of turns of fabric have been simultaneously wound between each of the form elements 45, the plates 52 with the filled form elements may be removed as a unit and located between suitable vulcanizing molds 70, the latter being similarly shaped to provide lateral pressure upon the wound fabric members. To this end outer portions of the forms are provided with ribs 72 which have faces 73 adapted to be juxtaposed when suitable vulcanizing pressure brings the forms together about the fabric. Adjoining these ribs are suitably shaped elongate depressions 74 adapted to fit about the ends of supports 45 and the V-shaped elements 49 thereon. The intermediate portions of the forms are provided with flat faces 76 designed to effect stretching of the fabric, to bring the spaced portions thereof into juxtaposition and to compress the same. It is evident that the vulcanizing forms are clamped about the gang of supports 45 and suitable heat is applied to this factor so that a non-skid device is formed between each of the supports. After vulcanization, the forms 45 are separated and the non-skid elements removed. One of these elements is shown in Figs. 17 and 18 and comprises an elongate body portion 80 with enlarged end portions 81 having curved extremities 82, and gradually decreasing in width as designated by numeral 83ª as it merges into the elongate intermediate portion 80. Disposed within each of the enlarged end portions 82 is an opening 83 having a rectilinear outer end and a V-shaped inner end, this opening being suitably shaped and disposed to receive fastening links to hold the non-skid devices to suitable circular supports, such as chains, whereby they may be retained upon the wheel of a vehicle.

While the process has been described in connection with the continuous, accurate and economical manufacture of a particular species of rubber and wire article, it will be clear that the mode of manufacture is applicable to many different manufactures of rubber with or without a textile or with or without a carried inclusion, such as a piece or pieces of wire or other metallic forms. Specifically, the described method and apparatus are particularly useful for making of rubber and wire articles in which one face of the finished product is free from abrasive or puncturing projections.

I claim:

1. The method of making a composite wire and fabric member, which comprises weaving wire and fabric strands to form a fabric, severing the fabric to form strips with wire ends at their raw edges, rubberizing the fabric, folding the strips with the raw edges juxtaposed, arranging a plurality of strips with their raw edges juxtaposed so that they are parallel and define a surface, and vulcanizing the rubber to form a unitary element.

2. The method of making a non-skid element, which comprises weaving wire and fabric strands to form a fabric, rubberizing the fabric, severing the fabric to form a strip with wire ends at raw edges, folding the strip along a longitudinal median with the raw edges juxtaposed, forming a flattened spiral of the folded fabric so that its raw edges define a surface, applying lateral pressure to the spiral and vulcanizing the strips under said pressure to form a unitary element.

3. The method of simultaneously making a plurality of non-skid members out of a rubberized, woven sheet having wire strands running in one direction, which comprises severing the sheet into a plurality of elongate strips with wire ends at their raw edges, folding each of these strips along a longitudinal median so that the wire ends are juxtaposed, winding the folded strips between parallel forms, and applying lateral pressure to the wound strips while they are maintained between the supports and then vulcanizing the rubber of the wound strips.

4. The method of simultaneously making a plurality of non-skid members out of a rubberized woven sheet having wire weft strands, which comprises severing the sheet into a plurality of elongate strips with wire ends at their raw edges, scoring a longitudinal median upon one face of the sheets, folding each of these strips along the scored median so that the wire ends are juxtaposed, winding the folded strips about transverse elements between parallel forms, and applying lateral pressure to the strips while they are maintained between the forms and vulcanizing them while under this pressure.

5. The method of making a composite wire and fabric member, which comprises folding rubberized strips of composite wire and fabric along a longitudinal element thereof, pressing the folded portions together, winding the folded strips into a form approximating that of the completed member, and vulcanizing and molding the wound strips into unitary members.

6. The method of making composite wire and fabric members, which comprises slitting composite wire and fabric into a plurality of strips, folding each strip along a longitudinal element thereof, laying a plurality of convolutions of each folded strip one upon the other about a form, vulcanizing the successive convolutions together and molding them closely about the form into unitary members, and removing the form.

7. The method of making composite wire and fabric members which comprises slitting composite wire and fabric into a plurality of strips, folding each strip in the same direction about a longitudinal element thereof to provide a series of similarly directed and substantially equally spaced folded strips, winding successive convolutions of each folded strip about a form while preserving the substantially equally spaced relation of the respective strips, vulcanizing the wound strips together and molding them closely about the form, and withdrawing the form transversely of the convolutions for preserving the continuity of the latter.

8. The method of making a composite wire and fabric member, which comprises forming a rubberized strip of composite wire and fabric into a relatively flat, elongate convolution and maintaining a substantially free and unobstructed space between the opposite sides of the convolution, laying successive convolutions thereon, vulcanizing the convolutions and molding the convolutions to close the space intermediate the ends thereof to provide a unitary member having recesses near the ends thereof.

Signed by me at Boston, Massachusetts, this twenty-seventh day of March 1928.

ROLAND B. RESPESS.